United States Patent [19]

Shook

[11] 3,880,625
[45] Apr. 29, 1975

[54] FILTER SYSTEM
[75] Inventor: Hugh Thomas Shook, West Covina, Calif.
[73] Assignee: Moore and Hanks Company, South El Monte, Calif.
[22] Filed: Sept. 28, 1973
[21] Appl. No.: 401,630

[52] U.S. Cl. ................ 55/473; 55/483; 55/484; 55/502; 55/511; 55/DIG. 29; 98/40 D
[51] Int. Cl. ............................................ B01d 46/10
[58] Field of Search ...... 55/DIG. 29, 473, 483, 484, 55/502, 511; 98/40 D

[56] References Cited
UNITED STATES PATENTS
3,380,219   4/1968   Madl, Jr. ...................... 98/40 D X
3,418,915   12/1968  Marble ......................... 55/DIG. 29
3,470,679   10/1969  Ramsey ........................ 55/DIG. 29
3,616,624   11/1971  Marsh .......................... 55/DIG. 29
3,760,568   9/1973   Neumann et al. ............... 55/473

Primary Examiner—Frank W. Lutter
Assistant Examiner—Kathleen J. Prunner
Attorney, Agent, or Firm—Christie, Parker & Hale

[57] ABSTRACT

Bypass around a filter in a conduit is prevented by providing first and second closures between the conduit and the high pressure and low pressure sides, respectively, of the filter, and creating a pressure in the conduit between the two closures that is lower than the pressure on the low pressure side of the filter.

1 Claim, 3 Drawing Figures

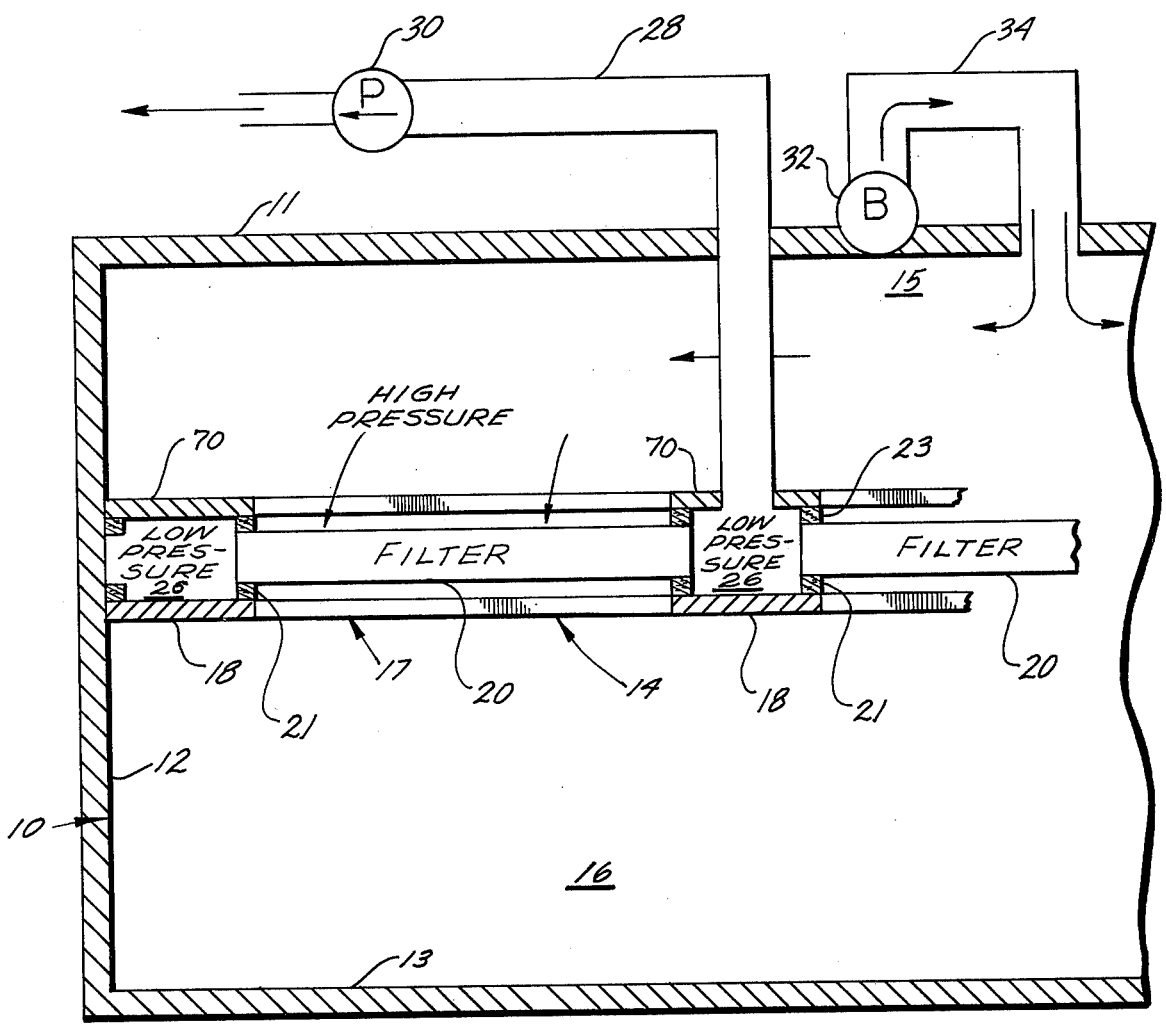

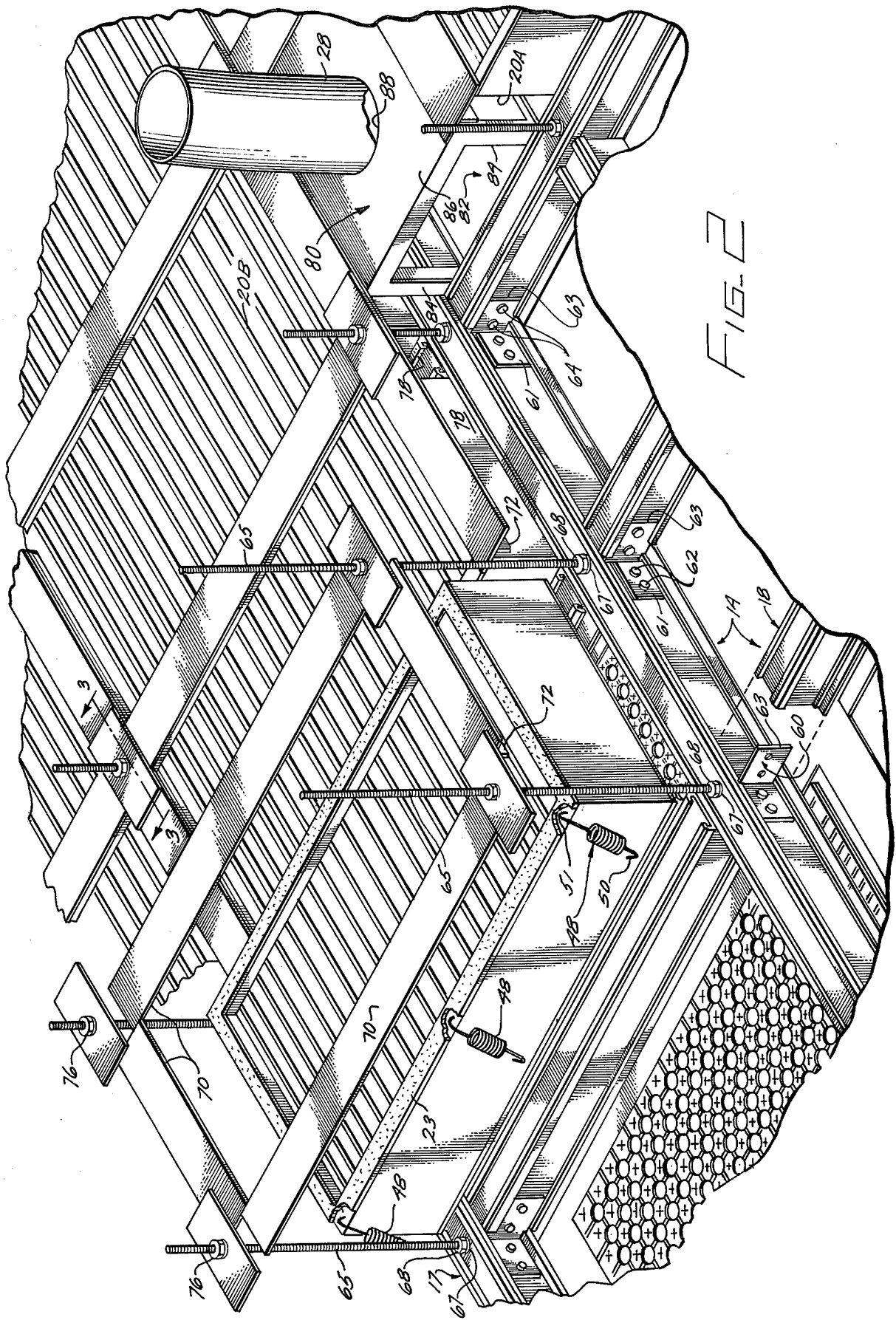

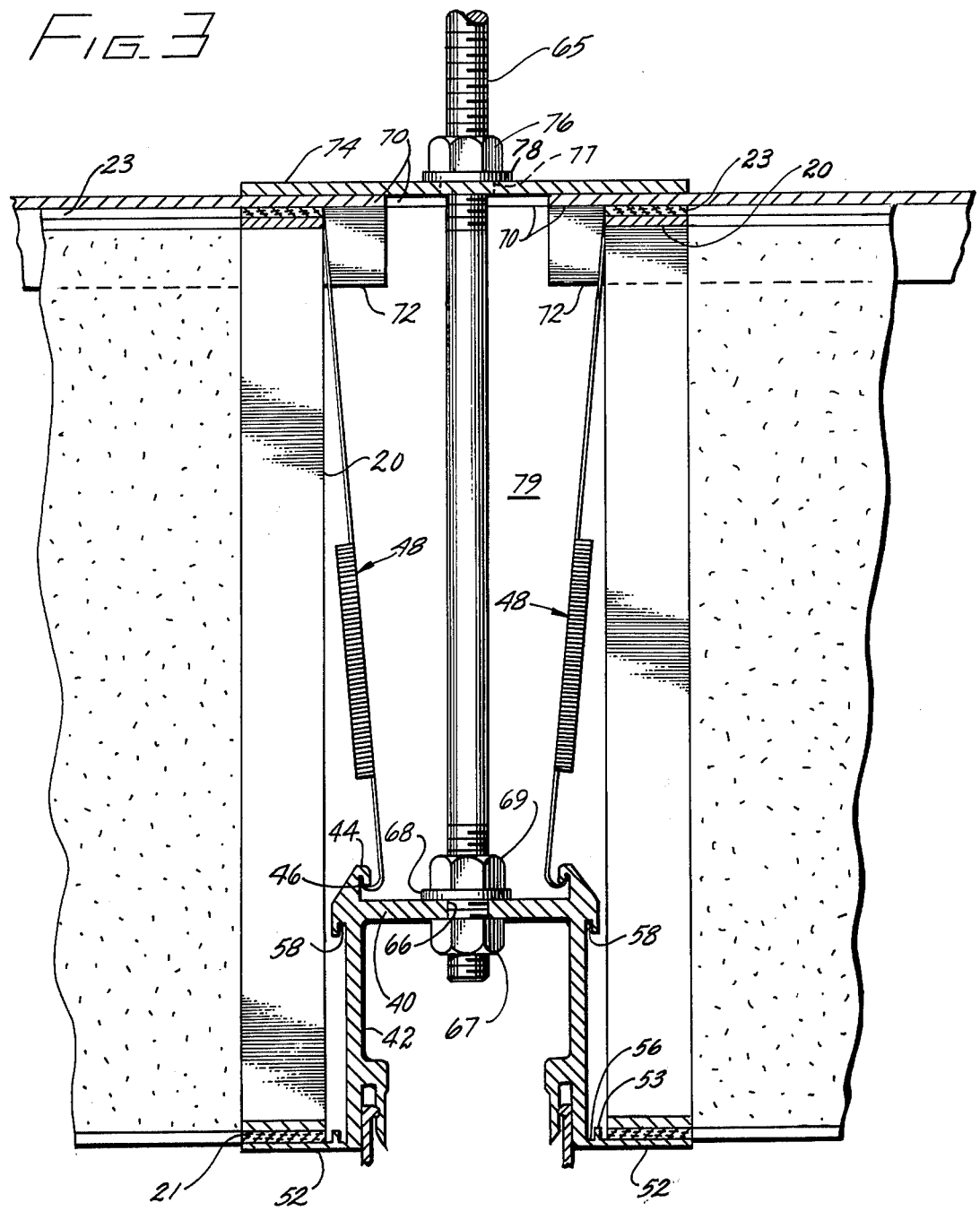

FILTER SYSTEM

This invention relates to filter systems and more particularly to a system which provides zero filter bypass.

In certain installations, particularly in "clean air rooms", maintenance of a high efficiency particulate air filtration system is often crucial to the success of the operations being conducted in the space supplied the filtered air.

The best filter is no better than the seal that holds it, and all seals are subject to thermal and mechanical shock, and general deterioration with the passage of time.

There are presently available highly efficient filters which, when properly installed and sealed, provide the filtration required for most clean air room operations. However, adequate sealing of these filters with techniques used before this invention required an inordinate amount of time and work, with a resulting high cost of installation. Moreover, even the most carefully installed prior art filter seals could not assure that a leak would not occur from an uncontrolled or unexpected force as mentioned above.

This invention provides a filter system installation which prevents bypass of the filter, even if the filter seal is damaged by thermal or mechanical shocks, or deteriorates with the passage of time.

Briefly, this invention provides a filtering apparatus which includes a conduit for the fluid to be filtered. Means are provided for supplying the fluid to the conduit. A filter is disposed in the conduit so that fluid passes from an upstream or high pressure side to a downstream or low pressure side of the filter, which removes particulate matter from the fluid. A first closure is provided between the conduit and the periphery of the upstream side of the filter, and a second closure is formed between the conduit and the periphery of the downstream side of the filter. Means are provided for creating a pressure in the conduit between the two closures lower than the pressure on the downstream side of the filter to prevent fluid from bypassing the filter.

When the invention is used to supply filtered air to a room, preferably an open grid is disposed in the room to divide the room into a working space and a plenum. A plurality of filters are mounted on the grid so that each filter has a high pressure side facing the plenum and a low pressure side facing the working space. Means are provided to form a first closure between the grid and the respective periphery of each of the high pressure sides of the filters. Means are also provided for forming a second closure between the grid and a respective periphery of each of the low pressure sides of the filters so as to form a channel network between the filters and the two closure means. Air is supplied under pressure to the plenum so that the air passes through the filters and into the working space. Means are provided for reducing the pressure in the channel network below that of the pressure in the working space to prevent air from bypassing the filters.

Preferably, gaskets are used to seal the respective peripheries of the filters to the grid in the first and second closure means. The preferred system also uses hold-down springs to keep the filters anchored firmly against the grid and minimize any leaks between the channel network and either side of the filters.

These and other aspects of the invention will be more fully understood from the following detailed description and the accompanying drawings in which:

FIG. 1 is a schematic diagram of the present preferred embodiment of the invention installed in a clean air room;

FIG. 2 is a fragmentary, perspective and exploded view of the presently preferred embodiment; and FIG. 3 is a view taken on line 3—3 of FIG. 2.

Referring to FIG. 1, a clean air room 10 includes a roof 11, a wall 12 and a floor 13. A horizontal grid 14 is suspended from the roof 11 so the grid divides the room into a plenum 15 above the grid and a working space 16 by any suitable means (not shown in FIG. 1) below. The grid includes a plurality of longitudinally extending main runners 17 and imperforate cross beams 18. Conventional horizontal filters 20, in the form of rectangular slabs, are disposed on respective lower gaskets 21 resting on the grid runners and beams. The filters are clamped in place by imperforate retainer plates 70 which seat on separate upper gaskets 23 on respective peripheries of the upper or high pressure sides of the filters. The retainer plates and grid form a channel network 26 around the adjacent edges of the filters so the channel is in direct contact with all of the filter periphery between the grid and the retainer plates. An evacuation duct 28 connects the channel network to the inlet of an evacuation pump 30, which maintains a pressure in the channel lower than the pressure in the plenum and the working space.

A blower 32 supplies air through a supply duct 34 to the plenum so that air in the plenum is at a sufficiently high pressure to force it through the filters to provide filtered air in the working space. Air exhausts from the working space through any suitable opening (not shown). If any air tends to leak past the gaskets from the plenum into the working space without passing through the filters, the leaking air is withdrawn through the channel network, which is at a lower pressure than the plenum and the working space. Thus, even though a gasket may be originally defective, or fail with the passage of time, any air leaking past it is pulled off through the evacuation duct so that no unfiltered air reaches the working space.

The filter assembly is shown in more detail in FIGS. 2 and 3. The longitudinally extending main runners 17 of the grid 14 are modified H-beams which each have a horizontal flange 40 and vertical side webs 42. The upper edge of each web carries an integrally formed and longitudinally extending hook strip 44, which has a downwardly opening, longitudinal groove 46. The lower end of a tension spring 48 carries a hook 50 which fits under the hook strip. The upper end of the tensin spring carries a hook 51 which hooks over the upper edge of a filter and under the upper gasket 23. A plurality of the springs are secured around the periphery of each filter to hold it snugly down against its respective lower gasket 21, which rests on an outwardly and longitudinally extending rail 52 formed integrally with the lower edge of each vertical side of the main runner. A separate vertical, upwardly and longitudinally extending rib 53 is formed on the upper surface of each horizontal rail 52. Each rib is spaced a slight distance from the adjacent respective vertical web to form an upwardly opening, longitudinally extending lower clip groove 56. An opposing downwardly opening and longitudinally extending upper clip groove 58 is formed in an outwardly extending and overhanging portion of the hook strip on the upper edge of each respective vertical web.

The upper and lower clip grooves receive the respective upper and lower edges of an L-shaped clip 60 which has a first leg 61 of the clip secured by bolts 62 to the adjacent vertical web of the main runner. A plurality of clips are secured to the main runners at intervals approximately equal to the width of the filters. Cross beams 18, which each have a cross section identical with that of the longitudinally extending main beams are slipped onto the upper and lower edges of the respective second legs 63 of the clips to form the grid which supports the filters. Bolts 64 secure the second leg of each clip to an adjacent respective vertical web on the cross beams. The longitudinal main beams are suspended from the roof on threaded vertical suspension rods 65, the upper ends of which are secured to the building roof by any suitable means, which may be conventional (not shown). The lower end of each suspension rod extends down through a hole 66 (FIG. 3) in the flange 40 of the main beam. The flange rests on a respective lower nut 67 threaded onto the lower end of the rod. A grommet 68 around the rod rests on the upper surface of the flange. A lock nut 69 on the rod squeezes down on the grommet to make an airtight seal between the rod and the flange. As shown best in FIG. 2, a separate suspension rod is secured on the grid at each common corner of four adjacent filters.

Filter retainer plates 70 rest on the upper surfaces of the upper gaskets of adjacent filters to span the space between adjacent filters. The retainer plates which rest on the longer sides of the filter gaskets are sufficiently long so the nearest portions of the ends of the adjacent respective shorter retainer plates (as shown in FIG. 2) abut against the sides of the longer plates. Each retainer plate includes a downwardly extending longitudinal stiffening rib 72 which is disposed between adjacent filters. A separate anchor plate 74 is mounted over the adjacent ends of the two colinear long filter retainer plates and two colinear short filter plates at each common corner of four adjacent filters. Each anchor plate is held down by a retaining nut 76 threaded onto a respective suspension rod which passes through an opening 77 in the center of the anchor plate. A grommet 78 between the anchor plate and retaining nut makes an airtight seal between the rod and anchor plate. Thus, the anchor plates and retainer plates coact with the edges of the filters and the main runners and cross beams in the grid to form a channel network 79, which extends throughout the assembly between adjacent filters.

A vacuum box 80 is mounted on the grid between the ends of an adjacent pair of filters 20A and 20B (FIG. 2). The box includes an imperforate bottom 82, four upright posts 84 at each corner and a top 86, which is imperforate except for a central opening 88 connected by the evacuation duct 28 to the evacuation pump (shown only in FIG. 1). The sides of the vacuum box are open and in communication with the channel network which extends between adjacent filters.

To assemble the filter system shown in FIGS. 1, 2 and 3, the longitudinally extending main runners are first secured to the roof with the suspension rods. The clips are mounted on the ends of the cross beams, and then the free tabs of the clips are slipped into the clip grooves of the main runners and slid to their proper positions. The clips are then secured to the main runners by bolts 62.

After the grid is assembled as shown in FIG. 2, the lower gaskets are set in place on the gasket rails, and the filters are lowered into position. The tension springs are hooked to the upper edges of the filters and in the clip strips to hold the filters snugly down on the lower gaskets. The upper gaskets are then put in place and covered by the filter retainer plates, which are then secured in place by the anchor plates held down by the retaining nuts 76.

Thus, relatively inexpensive gaskets can be used, and they are quickly put in place, as just described. If a leak develops around a gasket, the low pressure maintained in the channel network between adjacent edges of the filters prevents any unfiltered air from leaking into the working space below the grid.

Although the filter system just described is directed to a clean air room in which the grid is suspended from the ceiling, the invention can also be used in which the grid is mounted adjacent and parallel to the wall of the room so that filtered air flows from a plenum behind the grid and across the room to an opposite wall provided with an exhaust.

I claim:
1. Filtering apparatus comprising:
 a. a conduit for a fluid to be filtered;
 b. means for supplying the fluid to the conduit;
 c. a filter disposed in the conduit through which fluid passes from an upstream side to a downstream side and is filtered;
 d. imperforate first means forming a first closure between the conduit and around the periphery of the upstream side of the filter;
 e. imperforate second means forming a second closure between the conduit and around the periphery of the filter downstream of the first means to define a channel around the filter periphery and in direct communication with substantially all of the filter periphery between the first and second closure means; and
 f. means for creating a pressure in the channel between the two closures lower than the pressure of the fluid in the conduit on the downstream side of the filter to prevent fluid from bypassing the filter.

* * * * *